No. 12,368. REISSUED JULY 11, 1905.
G. GIBBS.
RAILWAY CAR FRAME.
APPLICATION FILED APR. 10, 1905.
2 SHEETS—SHEET 1.
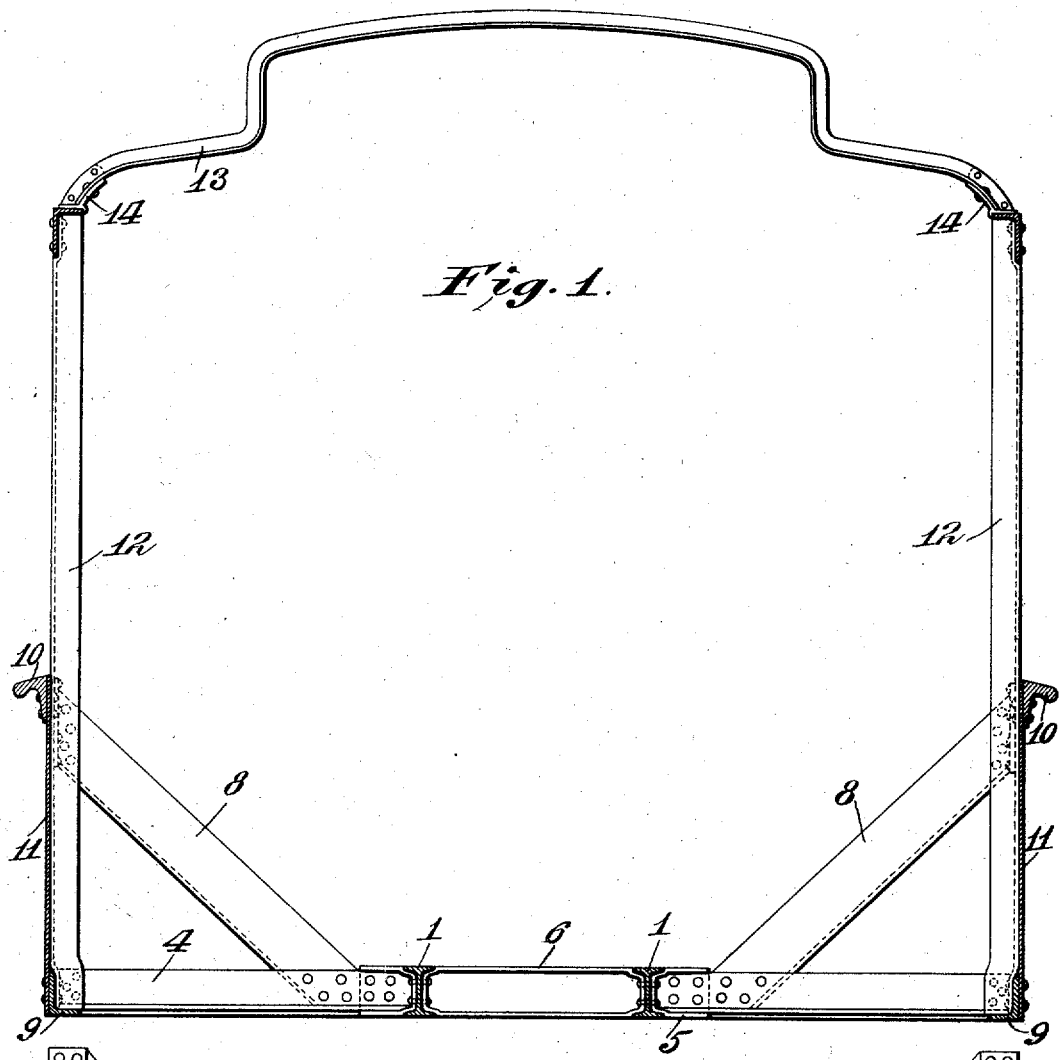
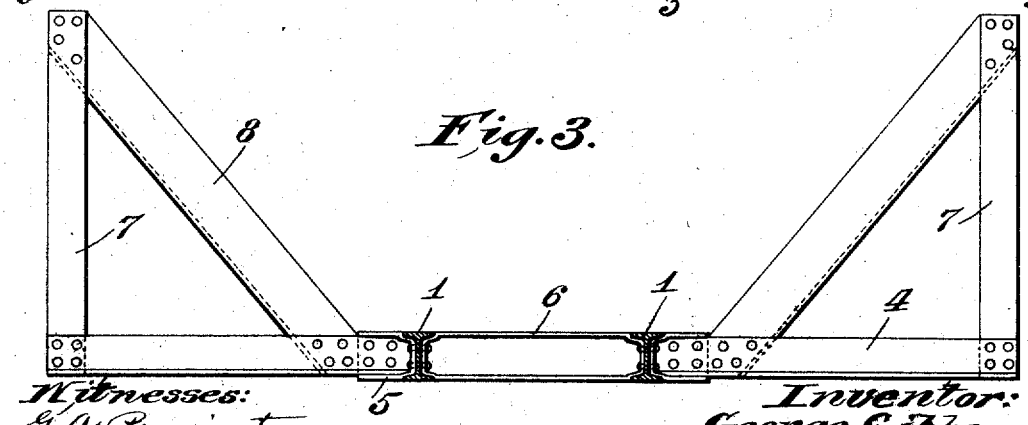
Witnesses:
G. A. Pennington
B. F. Funk
Inventor:
George Gibbs,
by Bakewell & Cornwall Attys.

No. 12,368. REISSUED JULY 11, 1905.
G. GIBBS.
RAILWAY CAR FRAME.
APPLICATION FILED APR. 10, 1905.
2 SHEETS—SHEET 2.
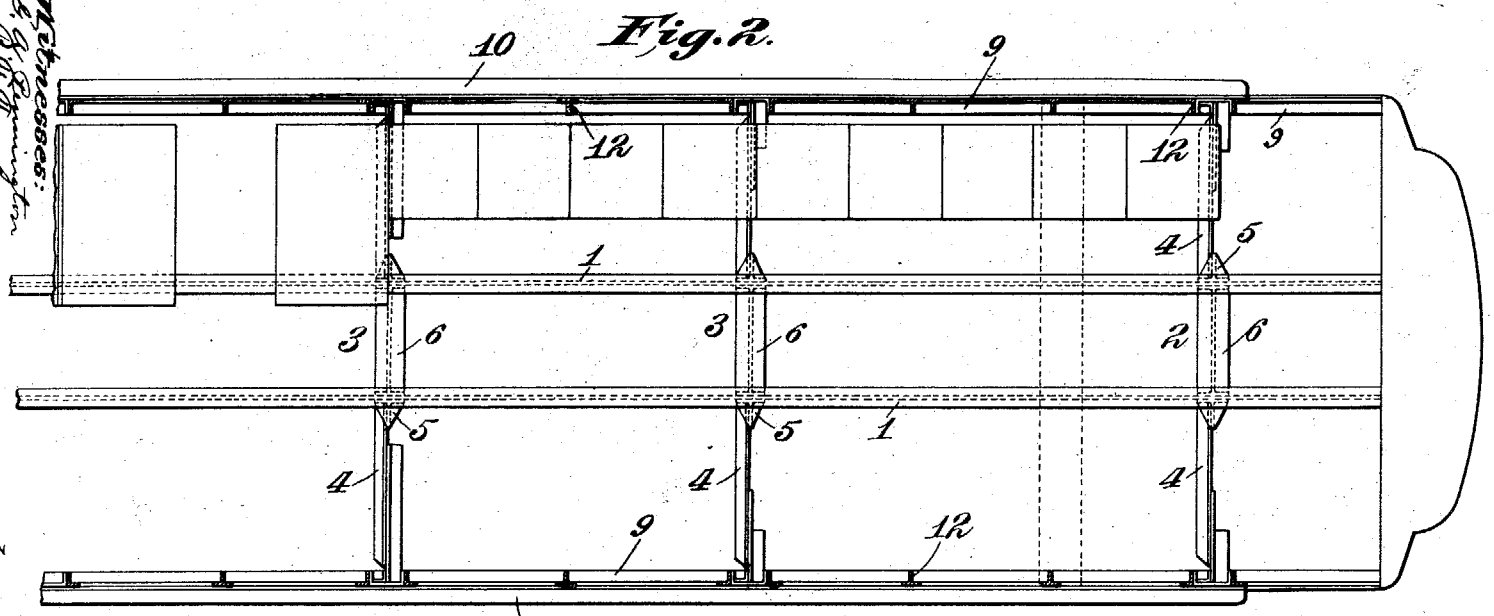
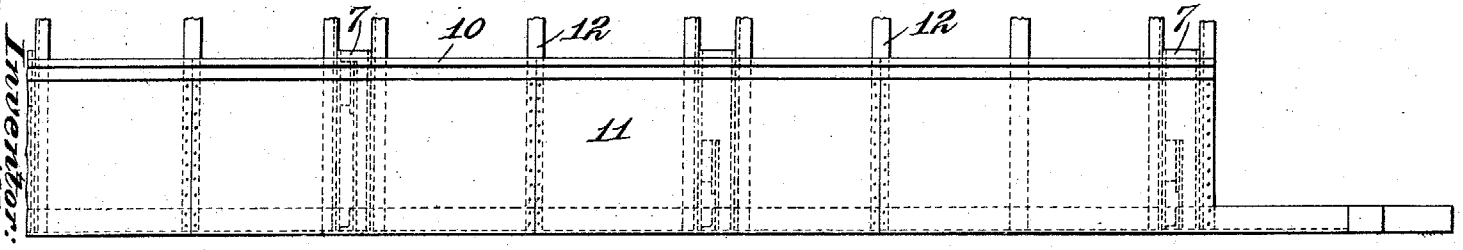
Witnesses:
G. A. Pennington
B. F. Funk
Inventor:
George Gibbs,
by Bakewell & Cornwall Attys.

No. 12,368. Reissued July 11, 1905.

UNITED STATES PATENT OFFICE.

GEORGE GIBBS, OF NEW YORK, N. Y.

RAILWAY-CAR FRAME.

SPECIFICATION forming part of Reissued Letters Patent No. 12,368, dated July 11, 1905.

Original No. 756,353, dated April 5, 1904. Application for reissue filed April 10, 1905. Serial No. 254,902.

*To all whom it may concern:*

Be it known that I, GEORGE GIBBS, a citizen of the United States, residing in the city, county, and State of New York, have invented a certain new and useful Improvement in Railway-Car Frames, of which the following is a full, clear, and exact description, such as will enable others skilled in the art to which it appertains to make and use the same, reference being had to the accompanying drawings, forming part of this specification, in which—

Figure 1 is a transverse section of the frame. Fig. 2 is a plan view. Fig. 3 shows one of the cross-bearing trusses separately, and Fig. 4 shows a portion of the side frame viewed from the outside.

This invention relates to cars, but it is particularly applicable to passenger-cars. Among other things it has been my object to provide a frame system which can be constructed for the most part of simple rolled plates and beams of common commercial shapes and to assemble the same in such a system of trusses and bridging as to carry the strains with least weight of material and least interference with the other functions of the structural parts.

The main purpose of my invention is to distribute the strains evenly over the floor and to carry the weight of the car chiefly on the side frames. I have therefore devised a novel combination of frame parts which accomplishes this result, and while the elements of this combination, each considered individually, may be old and well-known types I have invented certain novel forms for such elements which I prefer to employ and which are consequently described herein.

The invention which is the subject of the present application therefore consists not only in the broad combinations mentioned above, but also in the novel parts which may be, and preferably are, employed as the elements of such combinations.

For the bed or floor frame I prefer to employ one or more central longitudinal sills of commercial or other suitable shape, such as the I-beam 1. Combined with these are end sills 2 and cross-frames 3 for the purpose of stiffening the bed, distributing its strains, and for carrying the weight to the side frames. In the form illustrated the sills and cross-frames are each composed of three main parts. The parts 4 between the side frames and the center sills may be secured to the latter in any convenient manner, as by means of castings 5. The parts 6 between the center sills may be castings or such other construction as desired. In addition to the horizontal member composed of the parts mentioned I employ at each end of the "cross bearers or trusses," in which term the end sills may also be included, a vertical member 7, which latter by proper extension may, if desired, also constitute a roof-support. If desired, an inclined member 8 may also be used, secured to the member 4, preferably adjacent to the center sill. The cross-bearing truss, preferably of triangular form and composed of horizontal, vertical, and inclined members, is shown separately in Fig. 3, while Fig. 2 shows the floor or bed frame in plan. If desired, the sections of the truss adjacent to the side frames may be formed of plates constituting gussets.

The side frames (another important feature of the invention) are each composed of a continuous lower member 9, a continuous upper member 10, and between the two a central bracing 11, the whole forming a deep truss. The lower member is an angle-beam or other suitable shape having the flange thereof turned inward to form a shelf for supporting the cross-bearing trusses. The upper member is an angle or other suitable form having a flange turned outward. This arrangement of the upper member presents several advantages, among which I may mention that it permits the use of continuous roof-supports extending from the bed to the roof unbroken, whereas if the flange were turned inward either the supports or the upper member itself must necessarily be broken up in sections. Also the outwardly-turned flange may form the belt-rail below the windows of the car. The intermediate bracing is preferably continuous between the two members, so as to make the side frame or truss a plate-girder and may be made either in one continuous length or in sections of suitable size. The center bracing may also constitute the outside sheathing of the car.

In assembling the several elements of my car-frame the cross-bearers are secured to the lower member of the side frames and rest on the inwardly-turned flanges, as clearly shown in Fig. 1. The strains of the bed, its own weight, and the weight of its load are therefore carried by the side trusses, and that, too, without producing such strains as would tend to distort the sides of the car from the normal vertical plane. At the same time the vertical parts of the cross-bearing trusses, preferably secured to the side trusses, as indicated, prevent bulging or inward distortion of the sides from extraneous causes. In addition to the transverse trusses the ordinary body-bolsters are provided for the bed-frame.

The third feature of my invention pertains more particularly to the superstructure of the car comprising the roof and the sides above the belt-rails. Since by the construction described the weight and strains of the car are carried by side frames below the belt-rails, it is not necessary that the roof be utilized to increase the strength and stiffness of the lower portion of the car. The superstructure can therefore be extremely light, and in this respect is practically limited only by the requirements of properly housing the car. For this purpose I use light posts 12, which may be continuations of the truss members 7, they for this purpose extending from the floor to the roof and forming a frame for the windows in between them. The roof-frame is carried by the same posts and may be of any suitable construction—as, for example, the bent carlines 13, with longitudinal stiffening and framing angles 14, as shown in Fig. 1.

The numerous advantages resulting from my invention will be readily seen. In the first place, the floor strains and weight are evenly distributed and by means of the cross-bearing trusses are transferred to and carried by the side frames, which latter may be easily and cheaply made with a minimum of weight, they being strong enough to perform the functions required. Another and by no means unimportant feature, particularly in electric-traction systems, is the fact that the cross-trusses are located entirely above the bottom plane of the car, leaving the space below the same free for such apparatus as it is desired to place there.

The car-body is of course supported upon bolsters arranged near each end thereof, as is usual, and the plate-girder sides are sufficiently deep to transmit the floor-loads to the points of support. The angles 10 serve as compression-flanges, while the angles 9 serve as tension-flanges for the plate-girder sides.

The side-bearing trusses enable the use of light longitudinal sills, as these trusses transmit the floor-loads from the center sills to the side-plate girders, and for that reason there are a number of cross-bearing trusses arranged at points intermediate the bolsters. The center sills assist in transmitting the pulling and buffing stresses and also support the floor of the car at the center. The horizontal members 4 of the trusses are placed in compression in transmitting the load from the center sills to the plate-girder sides, but in addition to this function also serve as beams in supporting a portion of the floor-load.

The inclined members 8 are preferably flanged and are placed in tension at all times. The posts 7 are riveted to the webs of the plate-girder sides, and so help to resist buckling tendencies thereof in addition to providing a member of the triangular truss formation. The interposed castings 6 serve as filling-pieces between the center sills and also as floor-supports, these members 6 tying the center sills together and connecting the inner ends of the trusses in transverse alinement.

By continuing the posts 7 upwardly to support the roof of the car and connecting the upper ends of said posts to the angle 14, forming the side plate, it is obvious that such a construction is of sufficient strength to support the roof, the side-plate angle being strong enough to resist torsional and twisting strains without reliance being placed upon a separate facia-plate, which is usually secured to the side plate in the finish of the car. In order to have the vertical leg of the angle side plate flush with the outer faces of the posts 12, the upper ends of said posts may be bent inwardly, as shown in Fig. 1. The vertical legs of this angle may, if desired, be used as a facia-plate, for such it is in effect, and in this manner the use of a separate finishing-plate as a facia-plate could be dispensed with.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

1. In a railway-car frame, the combination with plate-girder sides and center sills, of a floor or bed frame having a plurality of cross-bearing trusses each composed of a horizontal member connected to the plate-girder sides and center sills, and a vertical member at each end thereof connected to the plate-girder sides, said cross-bearing trusses being supported by the lower parts of the plate-girder sides, with the said vertical members extending upwardly and adjacent to the upper parts of the plate-girder sides; substantially as described.

2. In a railway-car frame, the combination with plate-girder sides, of a floor-frame having a plurality of cross-bearing trusses each composed of a horizontal member, a vertical member at each end and connected to the plate-girder sides, and brace members connecting the horizontal and vertical members and connected to the center sills and to the plate-girder sides, said cross-trusses being supported by the lower part of the plate-girder sides with the vertical and brace members extending above the floor of the car; substantially as described.

3. In a railway-car frame, the combination with plate-girder sides and center sills, of a plurality of cross-bearing trusses each composed of a horizontal member connected to the plate-girder sides and center sills, a vertical member at each end of the horizontal member, and a brace member at each end and connected to the vertical member and bed-frame; substantially as described.

4. In a railway-car frame, a cross-bearing truss composed of a horizontal member having at each end a vertical member and a brace member, and plate-girder sides connected to the vertical members of the cross-bearing truss; substantially as described.

5. In a passenger-car, the combination with a steel body-frame constructed to supply the necessary strength and rigidity to the car, composed of plate-girder sides, cross-bearing trusses carried by the plate-girder sides and having means to prevent distortion of the latter, a floor carried by the cross-bearing trusses, a light housing to inclose the body, consisting of a roof-frame, and supports therefor carried by the body; substantially as described.

6. In a passenger-car, the combination with a steel body-frame constructed to supply the necessary strength and rigidity to the car, composed of side plate-girders, cross-bearing trusses supported by the lower parts of said girders, a floor carried by the cross-bearing trusses, a light housing to inclose the body, consisting of a roof-frame, and supports therefor carried by the body; substantially as described.

7. In a passenger-car, the combination of a steel body-frame constructed to supply the necessary strength and rigidity to the car composed of deep plate-girder sides located beneath the window-sills, supports for the floor carried by the plate-girder sides, means to prevent distortion of the side trusses, a light housing to inclose the body, consisting of a roof-frame, and supports therefor carried by the car; substantially as described.

8. In a passenger-car, the combination with a steel body-frame constructed to supply the necessary strength and rigidity of the car, composed of deep side trusses located below the windows, having upper members with outwardly-turned flanges constituting belt-rails underneath the windows of the car, and a floor supported by the lower parts of the side trusses, of a light housing to inclose the body, consisting of a roof-frame, and a plurality of supports therefor carried by the body; substantially as described.

9. In a passenger-car, the combination with a steel body-frame constructed to supply the necessary strength and rigidity of the car, composed of deep side trusses located below the windows, having lower members, and upper members constituting belt-rails underneath the windows of the car, cross-bearing trusses supported by the lower members of the side trusses, and a floor supported by the cross-bearing trusses, of a light housing to inclose the body, consisting of a roof-frame, and supports therefor carried by the body; substantially as described.

10. In a passenger-car, the combination of a steel body-frame constructed to supply the necessary strength and rigidity to the car, composed of deep plate-girder sides located below the windows having lower members, a floor carried by the lower members of the plate-girder sides, and a housing to inclose the body, consisting of a roof-frame, and supports therefor supported by the lower members of the plate-girder sides; substantially as described.

11. In a passenger-car, the combination with a steel body-frame constructed to supply the necessary strength and rigidity of the car, composed of side trusses located below the windows, consisting of upper members having outwardly-turned flanges constituting belt-rails underneath the windows of the car, lower members and connecting-bracings, and a floor supported by the lower members, of a light housing to inclose the body, consisting of a roof-frame, and supports therefor carried by the body; substantially as described.

12. In a passenger-car frame, a steel side frame comprising in combination a plate girder or truss constituting the outer sheathing of the car, an upper member for the girder having a flange turned outwardly to constitute the belt-rail underneath the windows of the car, a lower member having an inwardly-turned flange to support the floor of the car, and a plurality of roof-supports; substantially as described.

13. In a railway-car frame, the combination with side trusses each having an inwardly-extending flange at or near its lower part, and an upper member having an outwardly-extending flange, of a plurality of roof-supports carried by the lower member and extending therefrom to the roof unbroken; substantially as described.

14. In a railway-car, a frame comprising, in combination, a pair of side trusses each composed of a lower member having an inwardly-extending flange, an upper member having an outwardly-extending flange, and an intermediate bracing; a floor or bed frame composed of one or more longitudinal sills, and a plurality of cross-bearing trusses each consisting of a horizontal member, and a vertical and a brace member at each end thereof, said cross-trusses being supported on the inwardly-extending flanges of the side trusses; a plurality of roof-supports carried by the lower member of the side trusses and extending unbroken therefrom to the roof; and a roof-frame carried by said supports; substantially as described.

15. In a railway-car frame, the combination with a plate-girder side, of a center sill, and a triangular truss connected to the plate-girder side and the center sill and extending above the floor of the car; substantially as described.

16. In a railway-car, frame, the combination with a plate-girder side and a center sill, of a triangular truss member connected to the plate-girder side and center sill and having a vertical member extending above the floor, a horizontal member, the ends of which terminate adjacent the plate-girder side and center sill, and an inclined member connected to the ends of the horizontal and vertical members; substantially as described.

17. In a railway-car frame, the combination with a plurality of longitudinal sills and plate-girder sides, of a plurality of trusses supported by the longitudinal sills and plate-girder sides and extending above said sills, each truss having a tension member and a compression member; substantially as described.

18. In a railway-car frame, the combination with a plurality of longitudinal sills, a plurality of trusses supported by said sills and extending above the same, each truss having a tension member and a compression member, means for connecting the ends of the tension member and compression member together, a vertical member for connecting the opposite ends of the compression member and tension member, and a plate-girder side connected to the vertical member; substantially as described.

19. In a railway-car frame, the combination with plate-girder sides, of a floor or bed frame having a plurality of cross-bearing trusses of triangular form and extending above the floor-frame, said cross-trusses being supported by the plate-girder sides; substantially as described.

20. In a railway-car frame, the combination with plate-girder sides, of a floor or bed frame having a plurality of cross-bearing trusses on each side of the center sills thereof, and each truss having a vertical member, an inclined member extending above the floor-frame, and a horizontal member, the latter being in the horizontal plane of the floor-frame, said trusses being secured to the plate-girder sides; substantially as described.

21. In a passenger-car, the combination with a steel body-frame constructed to supply strength and rigidity to the car, said frame comprising plate-girder sides located below the windows, center sills, a horizontal member connecting the side trusses and center sills, and an inclined member extending above the floor-frame and having its ends terminating adjacent the plate-girder side and the center sill respectively; substantially as described.

22. In a railway-car frame, the combination with side trusses having an inwardly-extending flange at its lower part, an upper member having an outwardly-extending flange, a truss connected to the center sill and side truss and having a vertical member for supporting the roof of the car; substantially as described.

23. In a railway-passenger-car frame, the combination with an underframing, a cross-bearing truss carried by the underframing and having a vertical member for supporting the roof of the car, and plate-girder sides connected to the vertical member and below the window-openings; substantially as described.

24. In a railway passenger-car, the combination with center sills extending from end to end of the car, side sills extending from end to end of the car, a belt-rail having an outwardly-disposed flange, plates connecting the side sills and belt-rail, upstanding posts carried by the side sills, and cross-bearing trusses of which the upstanding posts form a part; substantially as described.

25. In a railway passenger-car, the combination with center sills and plate-girder sides, of a cross-bearing truss carried by the center sills and plate-girder sides, and having vertical members extending above the windows of the passenger-car, and carlines connected to said vertical members; substantially as described.

26. In a railway passenger-car, the combination with center sills and side sills, vertical roof-carrying posts connected to the side sills, plate-girder sides, horizontal members carried by the center sills and side sills, and inclined members connected to the horizontal and vertical members; substantially as described.

27. In a railway passenger-car, the combination with I-beam center sills, angles having their flanges turned inwardly, plates connected to said angles, flanged compression members connected to the upper edges of the plates and having their flanges turned outwardly, vertical posts connected to the said plates, horizontal members, and diagonal members connected to the horizontal members and vertical posts; substantially as described.

28. The combination with a plate-girder side, of cross-bearing trusses secured to the plate-girder side and center sill, said cross-bearing trusses having vertical members comprising posts secured to the plate-girder side and extending above the same, and a side plate secured to the upper ends of said posts; substantially as described.

29. In a passenger-car, the combination with a plate-girder side located beneath the window-openings, of center sills, cross-bearing trusses connected to the center sills and plate-girder sides, said cross-bearing trusses having vertical members comprising posts riveted to the webs of the plate-girder sides, and extending upwardly between said window-openings, and a side plate riveted to the upper ends of said posts; substantially as described.

30. In a car, the combination with a plate-girder side whose compression-flange forms a belt-rail for the car, and whose tension-flange is beneath the horizontal plane of the floor-framing, posts carried by said plate-girder side and extending above said belt-rail, and an angle forming a side plate riveted to the upper ends of said posts; substantially as described.

31. In a car, the combination with plate-girder sides designed to carry the major portion of the load, transversely-arranged trusses extending from said plate-girder sides and having members located above the floor-line of the car, and a center sill to which the inner ends of said trusses are connected; substantially as described.

32. In a car, the combination with spaced center sills, plate-girder sides, trusses extending inwardly from said plate-girder sides to said spaced center sills, and filling-pieces between said center sills and in the transverse plane of said trusses; substantially as described.

In testimony whereof I hereunto affix my signature, in the presence of two witnesses, this 4th day of April, 1905.

GEORGE GIBBS.

Witnesses:
H. M. HEWITT,
H. S. JOHNSON.